May 19, 1942.  J. H. PRATT ET AL  2,283,695
HYDRAULIC CONTROL MECHANISM
Filed June 19, 1941  2 Sheets-Sheet 1

James Henry Pratt
Gilbert Edgar Manley
Albert Henry Godfrey Girling
INVENTORS

BY Marshall & Marshall
ATTORNEYS

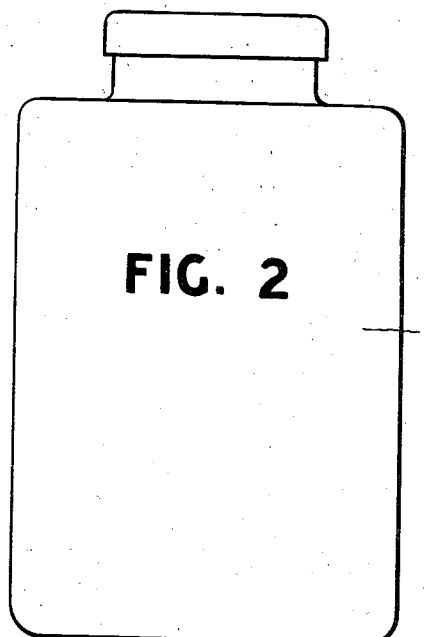
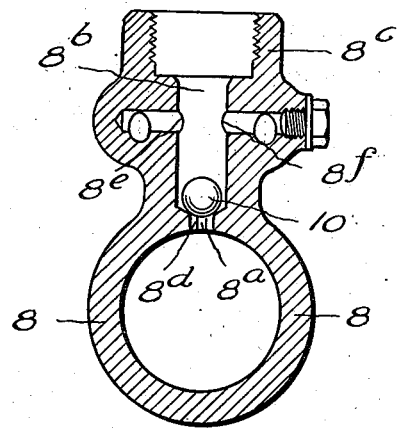
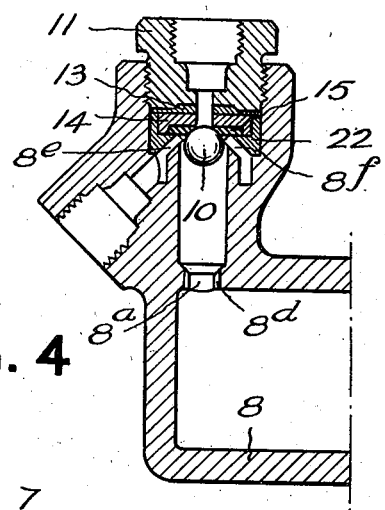
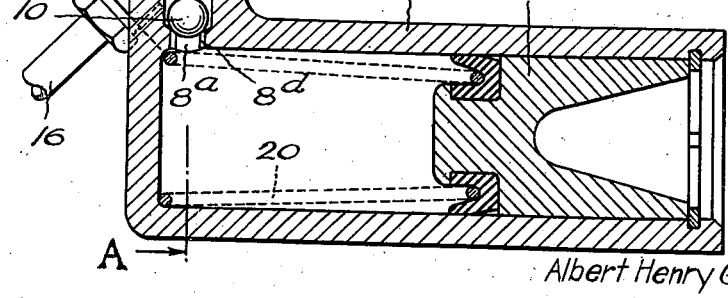

Patented May 19, 1942

2,283,695

UNITED STATES PATENT OFFICE 2,283,695

HYDRAULIC CONTROL MECHANISM

James Henry Pratt, Birmingham, Gilbert Edgar Manley, Earlswood, and Albert Henry Godfrey Girling, Edgbaston, Birmingham, England Application June 19, 1941, Serial No. 398,850
In Great Britain June 5, 1940

3 Claims. (Cl. 60—54.5)

This invention has reference to improvements in hydraulic control mechanism and is concerned particularly with hydraulic control mechanism of the kind wherein the controlling operation is performed through the agency of a piston and cylinder mechanism common to the unit or units to be actuated and which piston and cylinder mechanism is generally termed the master cylinder mechanism.

In connection with hydraulic control mechanism of the said kind it is usual to embody with the master cylinder mechanism, means whereby communication can be established between the interior of the master cylinder and a liquid reservoir, so that when the master cylinder mechanism is at rest liquid can pass from the master cylinder to the liquid reservoir in the event of the development of abnormal pressure in the master cylinder and so that liquid can pass from the liquid reservoir for recuperation purposes in the event of a loss of liquid in the pipe line or in the event of the production of sub-atmospheric pressures in the master cylinder, and the present invention has for its object the provision of improved valve means for controlling communication as aforesaid, which is simple both in construction and in operation.

According to the invention the improved hydraulic control mechanism of the kind hereinbefore referred to is characterised in that there is disposed in the line of flow between the master cylinder and the transmission line or lines to the unit or units to be actuated a valve chamber which has communication not only with the transmission line and with the master cylinder, but also with the liquid reservoir and in that there is disposed within the said chamber, a valve means which is displaced by the surge of liquid which obtains upon the initiation of a working stroke and caused to move with the flow of liquid to close the means of communication between the liquid reservoir and the aforesaid valve chamber.

The invention will now be described with particular reference to the accompanying drawings which illustrate the invention in its application to an hydraulically operated braking means for vehicles.

In the drawings—

Fig. 2 is a detail view, mainly in section and drawn to a larger scale, of the improved hydraulic control mechanism utilised in Fig. 1.

Fig. 3 is a cross-section of part of Fig. 1, the section being taken on the plane indicated by the line A in the said Fig. 1 looking in the direction of the arrow to said line and Fig. 4 is a fragmentary view in longitudinal vertical section of a modified form of the improved hydraulic control mechanism illustrated in Figs. 1–3.

Like numerals of reference indicate similar parts in the several views.

Figure 1:
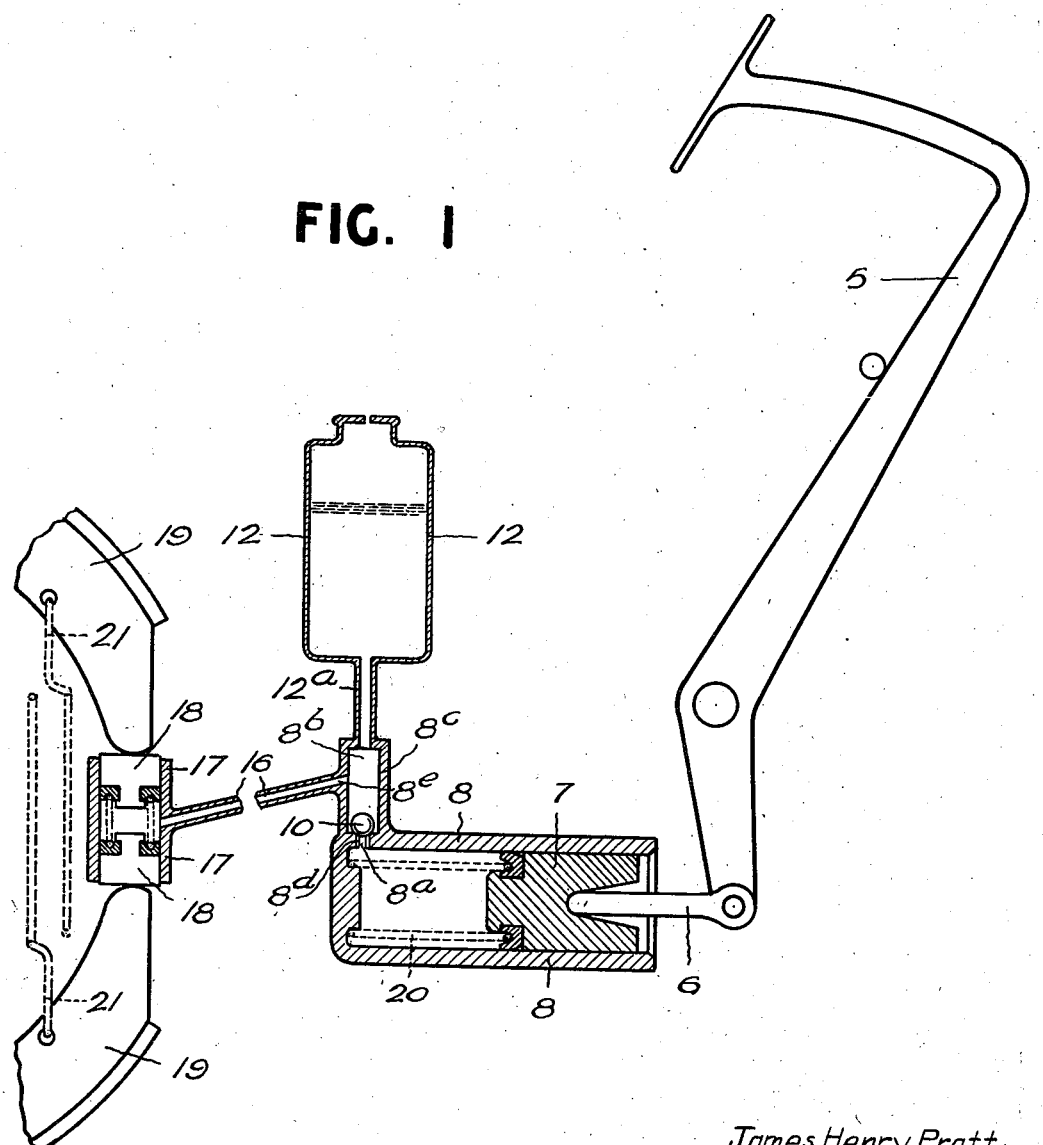
Fig. 1 is a diagrammatic view mainly in section of an hydraulically operated braking means incorporating the improved hydraulic control mechanism.

Referring first to the construction illustrated in Figs. 1–3, the brake pedal lever 5 has pivotally connected to the lower end thereof one end of a rod 6 the other end whereof is in abutment with the outwardly presented portion of a master piston 7 which is reciprocably mounted within its master cylinder 8. This master cylinder 8 is provided adjacent to its closed end with a port which communicates by way of a passage 8a with the interior of a valve chamber 8b constituted by a vertical extension 8c of the cylinder 8. The walls of the passage 8a are provided with notches 8d for a purpose to be set out hereinafter and the upper end of the said passage 8a constitutes a lower seating for a ball valve 10 which is located within the valve chamber 8b.

The ball valve 10 is of slightly less diameter than the diameter of the chamber 8b so that the said ball valve 10 is freely displaceable within the chamber 8b. For example if the ball valve 10 is $\frac{5}{16}$ of an inch in diameter the bore of the chamber 8b may be .015 of an inch larger in diameter.

The upper end of the valve chamber 8b is closed by a screw plug 11 having therein a centrally disposed passage which communicates with a liquid reservoir 12 by way of a pipe 12a.

Located between the lower end of the plug 11 and a shoulder at the upper end of the valve chamber 8b are a relatively soft washer 13, a metallic washer 14 and a resilient washer 15 said resilient washer 15 being disposed with a recessed portion in the underside of the metal washer 14. The metal washer 14 prevents undue deformation of the resilient washer 15 as in the event of any such tendency the ball valve 10 contacts with the lower edge of the hole in the metal washer 14 and thus avoids any further deformation of the said resilient washer 15 but at the same time permitting an effective sealing of the hole therethrough.

Adjacent the upper end the valve chamber has communication with outlet passages 8e, 8f which communicate by way of downwardly inclined pipe lines 16 leading to the cylinders 17 containing the oppositely disposed pistons 18 for operating the brake shoes 19. The passages 8e, 8f open into the chamber 8b at positions which are slightly below the ball valve 10 when it is in its uppermost position as indicated in dotted lines in Fig. 2.

The master piston 7 co-operates with a spring 20 which tends to move the said master piston 7 to its out of action position and the brake shoes 19 co-operate with a "pull-off" spring 21 in known manner.

The operation of the invention is as follows:

When the brakes are out of action the ball valve 10 under the action of gravity rests on its seating at the upper end of the passage 8a but liquid is able to pass to and from the master cylinder 8 by way of the notches 8d. When the pedal lever 5 is moved for the purpose of applying the brakes the associated movement of the master piston 7 within the master cylinder 8 occasions a surge or impulsive flow of liquid in the valve chamber 8b which carries the ball valve 10 with it without any measurable increase in pressure and for a very small travel of the pedal lever 5. Ultimately the liquid flow seats the ball valve 10 firmly on the lower central portion of the resilient washer 15 so as to seal the hole therein and so cut off communication between the liquid reservoir 12 and the valve chamber 8b and the master cylinder 8. After this sealing has been achieved further movement of the master piston 7 displaces liquid to the cylinders 17 by way of the outlet passages 8e, 8f and pipe lines 16.

The use of a resilient washer 15 ensures effective sealing by the ball valve 10 even should there be traces of solid foreign matter in the liquid and when the said washer 15 has been compressed to an extent which ensures effective seating of the ball valve 10 further compression of the said washer is prevented by reason of the surface of the ball valve 10 coming into contact with the lower edge of the hole through the metal washer 14.

The ball valve 10 is maintained on its uppermost seat during braking by virtue of the pressure in the system.

When pressure on the pedal lever 5 is removed for releasing the brakes, the master piston 7 is moved rapidly to its out of action position at a speed which exceeds the rate of liquid flow from the cylinders 17 under the action of the pull-off springs 21 and as a consequence pressure in the valve chamber 8b falls below atmospheric pressure so that the ball valve 10 drops and comes to rest on its lowermost seating at the upper end of the passage 8a.

The residue of liquid coming from the cylinders 17 can thus pass freely to the master cylinder 8 and/or to the reservoir 12 and because the ball valve 10 is now below the outlet passages 8e, 8f no flow of liquid between the cylinders 17 and the reservoir 12 resulting from any cause whatsoever can cause the ball valve 10 to move to cut off communication with the said reservoir 12.

The inclination of the pipe lines 16 in the manner shown facilitates the escape to the reservoir and thence to the atmosphere of any air contained in the liquid.

In the modification illustrated in Fig. 4 the outlet passages 8e, 8f enter the valve chamber 8b above the diametral plane of the ball valve 10 and consequently when the brake pressure is released the pressure developed previously in the system together with the pressure of the head of liquid in the reservoir 12 acts on the top portion of the ball valve 10 and tends to move the ball valve 10 from its uppermost position against any pressures existing in the master cylinder 8. In this modification the metal washer 14 co-operates with a locating washer 22.

It will be appreciated that with a hydraulic control mechanism as hereinbefore described any expansion or contraction of the liquid does not occasion in the system a pressure above or below that of the atmosphere when the brakes are out of action. Moreover the valve device is positive and quick in action regardless as to whether or not the pedal lever 5 is actuated slowly or quickly in order to apply the brakes and furthermore the valve device is not subject to failure through leakage.

In addition since there is a continually open passage between the cylinders 17 and the reservoir 12 when the brakes are out of action subatmospheric pressures will not be created in the system thus eliminating any tendency for air to be drawn from the atmosphere past the pistons 18 into the said system.

Although in the embodiments described a ball valve is utilised a freely displaceable piston valve could be used if preferred and furthermore it will be understood that the invention is equally applicable to hydraulic means for actuating mechanism other than vehicle brakes.

Having now described our invention what we claim and desire to secure on Letters Patent is:

1. In a hydraulic control mechanism, in combination, a master cylinder, a piston therefor, a reservoir having a vent to the atmosphere, a check valve connecting the master cylinder with the reservoir, having a valve member that is normally in position to open communication between the reservoir and the master cylinder; and is moved to a posititon to close said communication by flow of fluid from the master cylinder to the reservoir, a unit to be actuated, and a transmission line leading to said unit and connected to said check valve at a point whose communication with the reservoir is unobstructed by the valve member when the valve member is in said former position, and whose communication with the master cylinder is unobstructed by the valve member when the valve member is in said latter position.

2. In a hydraulic control mechanism, in combination, a master cylinder, a piston therefor, a reservoir located above the master cylinder, having a vent to the atmosphere, a check valve connecting the master cylinder with the reservoir, having a ball valve member that is normally in position to open communication between the reservoir and the master cylinder and is moved to a position to close said communication by flow of fluid from the master cylinder to the reservoir, said valve member having a substantial travel between its open position and its closed position, a unit to be actuated, and a transmission line leading to said unit and connected to said check valve at a point whose communication with the reservoir is unobstructed by the valve member when the valve member is in said former position, and whose communication with the master cylinder is unobstructed by the valve member when the valve member is in said latter position.

3. In a hydraulic control mechanism, in combination, a master cylinder, a piston therefor, a reservoir located above the master cylinder, having a vent to the atmosphere, a valve chamber having a port at its lower end leading to the master cylinder, and having a port at its upper end surrounded by a resilient valve seat and leading to the reservoir, a ball valve member in the valve chamber that is normally in position to open communication between the reservoir and the master cylinder and is moved onto said seat to close said communication by flow of fluid from the master cylinder to the reservoir, said resilient seat being backed by a rigid annular shoulder adapted to contact said valve member after sufficient compression of said resilient valve seat to ensure effective sealing, a unit to be actuated, and a transmission line leading from said valve chamber to said unit.

JAMES HENRY PRATT.
GILBERT EDGAR MANLEY.
ALBERT HENRY GODFREY GIRLING.